(12) United States Patent
Zhang et al.

(10) Patent No.: US 10,890,950 B2
(45) Date of Patent: Jan. 12, 2021

(54) DUAL-TORQUE HINGE MECHANISM AND RELATED ELECTRONIC DEVICE

(71) Applicant: Wistron Corporation, New Taipei (TW)

(72) Inventors: Bin Zhang, New Taipei (TW); Wenwu Yuan, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 16/391,310

(22) Filed: Apr. 23, 2019

(65) Prior Publication Data

US 2020/0159292 A1  May 21, 2020

(30) Foreign Application Priority Data

Nov. 19, 2018  (CN) .......................... 2018 1 1378453

(51) Int. Cl.
*E05D 11/08* (2006.01)
*G06F 1/16* (2006.01)

(52) U.S. Cl.
CPC .......... *G06F 1/1681* (2013.01); *E05D 11/084* (2013.01); *G06F 1/1616* (2013.01); *E05Y 2900/606* (2013.01)

(58) Field of Classification Search
CPC .......... Y10T 16/511; Y10T 16/540345; Y10T 16/540255; Y10T 16/5387; Y10T 16/5403; Y10T 16/53828; Y10T 16/53838; Y10T 16/53888; E05D 3/02; E05D 11/06; E05D 11/081; E05D 11/084; E05D 11/087; E05D 11/088; E05D 11/1028; G06F 1/1616; G06F 1/1681; E05Y 2900/606
See application file for complete search history.

(56) References Cited

U.S. PATENT DOCUMENTS 2,490,172 A * 12/1949 Swahnberg ........... E05D 11/087
16/330
4,750,685 A * 6/1988 Frei ........................ G06F 1/1616
16/330

(Continued)

FOREIGN PATENT DOCUMENTS

| CN | 201050562 Y | 4/2008 |
| CN | 101672323 A | 3/2010 |
| KR | 101032450 B1 * | 5/2011 |

*Primary Examiner* — Chuck Y Mah
(74) *Attorney, Agent, or Firm* — Winston Hsu (57) ABSTRACT

A dual-torque hinge mechanism applied to an electronic device includes a rotary shaft, a first bridging component, a second bridging component, a first resistance component, a second resistance component and a torque generating component. The first and second bridging components are connected to the rotary shaft. The first and second resistance components are rotatably disposed on the rotary shaft. A stretching portion of the second resistance component is engaged with a positioning portion of the second bridging component. The torque generating component is fixed to the rotary shaft. A first driving portion of the first resistance component is not rotated when being pushed by a second driving portion of the torque generating component moving in a first rotation direction. The first driving portion is rotated when being pushed by the second driving portion moving in a second rotation direction different from the first rotation direction.

24 Claims, 9 Drawing Sheets

(56) References Cited

U.S. PATENT DOCUMENTS

| | | | | |
|---|---|---|---|---|
| 4,881,698 A * | 11/1989 | Doiron | G06F | 1/1681 |
| | | | | 16/303 |
| 5,276,945 A * | 1/1994 | Matsumura | G06F | 1/1616 |
| | | | | 16/330 |
| 5,598,607 A * | 2/1997 | Katagiri | E05D | 11/087 |
| | | | | 16/330 |
| 5,706,700 A * | 1/1998 | Takagi | G06F | 1/1616 |
| | | | | 16/330 |
| 6,125,509 A * | 10/2000 | Hartigan | E05D | 11/087 |
| | | | | 16/330 |
| 6,584,645 B2 * | 7/2003 | Migli | E05D | 11/06 |
| | | | | 16/337 |
| 6,951,266 B2 * | 10/2005 | Tournier | G06F | 1/1681 |
| | | | | 16/303 |
| 7,082,642 B2 * | 8/2006 | Su | E05D | 11/087 |
| | | | | 16/330 |
| 7,520,026 B1 * | 4/2009 | Lin | E05D | 11/06 |
| | | | | 16/337 |
| 7,536,749 B2 * | 5/2009 | Lu | G06F | 1/1616 |
| | | | | 16/330 |
| 7,603,747 B2 * | 10/2009 | Ho | G06F | 1/1616 |
| | | | | 16/330 |
| 7,823,254 B2 * | 11/2010 | Lin | E05D | 11/087 |
| | | | | 16/330 |
| 7,921,515 B2 * | 4/2011 | Chiang | G06F | 1/1616 |
| | | | | 16/330 |
| 8,015,668 B2 * | 9/2011 | Wang | G06F | 1/1681 |
| | | | | 16/303 |
| 8,051,537 B2 * | 11/2011 | Wang | E05D | 11/087 |
| | | | | 16/330 |
| 8,069,534 B2 * | 12/2011 | Wang | G06F | 1/1616 |
| | | | | 16/330 |
| 8,261,412 B1 * | 9/2012 | Lin | G06F | 1/1681 |
| | | | | 16/330 |
| 8,646,152 B2 * | 2/2014 | Lin | E05D | 3/04 |
| | | | | 16/330 |
| 9,206,636 B2 * | 12/2015 | Nagl | E05F | 1/1215 |
| 2009/0235489 A1 * | 9/2009 | Chang | G06F | 1/1681 |
| | | | | 16/337 |
| 2011/0088219 A1 * | 4/2011 | Huang | G06F | 1/1681 |
| | | | | 16/319 |
| 2011/0232035 A1 * | 9/2011 | Huang | G06F | 1/1681 |
| | | | | 16/303 |
| 2014/0331452 A1 * | 11/2014 | Zhang | G06F | 1/1681 |
| | | | | 16/337 |
| 2019/0064886 A1 * | 2/2019 | Wendt | G06F | 1/1679 |

* cited by examiner

DUAL-TORQUE HINGE MECHANISM AND RELATED ELECTRONIC DEVICE

BACKGROUND OF THE INVENTION

1. Field of the Invention

The present invention relates to a hinge mechanism and a related electronic device, and more particularly, to a dual-torque hinge mechanism and an electronic device with a dual-torque altering function.

2. Description of the Prior Art

A notebook computer comprises an upper screen cover and a lower host base that are pivotally connected together by a hinge mechanism. The hinge mechanism provides torque to support the screen cover when the screen cover is being folded and unfolded relative to the host base for preventing the screen cover from being damaged by unexpected falling onto the host base. The conventional hinge mechanism generates the same torque no matter what direction the screen cover is rotated relative to the host base. When the notebook computer is being folded, the conventional hinge mechanism provides a large-scale torque to hold the screen cover to avoid the screen cover from rapidly hitting the host base due to its gravitational force plus an external force applied by a user; however, the user has to apply a large-scale external force to overcome the large-scale torque of the conventional hinge mechanism for unfolding the screen cover, which means the user cannot unfold the notebook computer by a single hand. The notebook computer with the conventional hinge mechanism does not meet the needs of modern consumer electronic products. Thus, how to design a hinge mechanism capable of providing torque of different scales when the notebook computer is being folded and unfolded is an important issue in the related mechanical design industry.

SUMMARY OF THE INVENTION

The present invention provides a dual-torque hinge mechanism and an electronic device with a dual-torque altering function for solving the above-mentioned drawbacks.

According to one embodiment of the present invention, a dual-torque hinge mechanism includes a rotary shaft, a first bridging component, a second bridging component, a first resistance component, a second resistance component and a torque generating component. The first bridging component is connected to the rotary shaft. The second bridging component is rotatably disposed on the rotary shaft. The first resistance component is rotatably disposed on the rotary shaft and has a first driving portion. The second resistance component abuts against the first resistance component and is rotatably disposed on the rotary shaft and connected to the second bridging component. The second resistance component and the second bridging component are simultaneously rotated relative to the rotary shaft. The torque generating component is fixed to the rotary shaft. The torque generating component has a second driving portion. The second driving portion does not actuate the first driving portion and the first resistance component is not rotated with rotation of the torque generating component when the first driving portion is pushed by the second driving portion rotated in a first rotary direction. The first resistance component is rotated with the rotation of the torque generating component when the first driving portion is pushed by the second driving portion rotated in a second rotary direction different from the first rotary direction.

According to another embodiment of the present invention, the dual-torque hinge mechanism further includes a constraining component and at least one buffering component. The constraining component is disposed on the rotary shaft. The buffering component is disposed on the rotary shaft between the constraining component and the torque generating component and abuts against the torque generating component.

According to still another embodiment of the present invention, the dual-torque hinge mechanism further includes a third resistance component and a fourth resistance component. The third resistance component is fixed to the rotary shaft. The fourth resistance component is rotatably disposed on the rotary shaft. The fourth resistance component has another stretching portion configured to engage with another positioning portion of another second bridging component of the dual-torque hinge mechanism.

According to still another embodiment of the present invention, the rotary shaft has a first cross section formed along a radial direction of the rotary shaft. A shape of the first cross section is different from shapes of a through hole of the first resistance component and a through hole of the second resistance component, and a portion of the rotary shaft having the first cross section is engaged with the torque generating component.

According to still another embodiment of the present invention, the first driving portion is a roller movably disposed inside a slot of the first resistance component, two ends of the slot respectively have a first depth end with a first depth and a second depth end with a second depth, the first depth is greater than the second depth, and a diameter of the roller is ranged between the first depth and the second depth.

According to still another embodiment of the present invention, the second driving portion is a convex structure configured to engage with the roller for moving the roller to the first depth end or to the second depth end. An interval between an inner surface of the torque generating component and an outer surface of the first resistance component is smaller than a difference between the diameter and the second depth.

According to still another embodiment of the present invention, interval between an inner surface of the torque generating component and an outer surface of the first resistance component is smaller than a difference between the diameter and the second depth. The first driving portion is a convex structure configured to engage with the roller for moving the roller to the first depth end or the second depth end. Further, the first driving portion is a slide block, and an abutting area of the slide block slidably abuts against the second driving portion.

According to still another embodiment of the present invention, an electronic device with a dual-torque altering function includes a first member, a second member and a dual-torque hinge mechanism. The dual-torque hinge mechanism is disposed between the first member and the second member. The first member is rotated relative to the second member via the dual-torque hinge mechanism. The dual-torque hinge mechanism includes a rotary shaft, a first bridging component, a second bridging component, a first resistance component, a second resistance component and a torque generating component. The first bridging component is connected to the rotary shaft and assembled with the first member. The second bridging component is rotatably disposed on the rotary shaft and assembled with the second member. The first resistance component is rotatably disposed on the rotary shaft and has a first driving portion. The second resistance component abuts against the first resistance component and is rotatably disposed on the rotary shaft and connected to the second bridging component. The second resistance component and the second bridging component are simultaneously rotated relative to the rotary shaft. The torque generating component is fixed to the rotary shaft. The torque generating component has a second driving portion. The second driving portion does not actuate the first driving portion and the first resistance component is not rotated with rotation of the torque generating component when the first driving portion is pushed by the second driving portion rotated in a first rotary direction. The first resistance component is rotated with the rotation of the torque generating component when the first driving portion is pushed by the second driving portion rotated in a second rotary direction different from the first rotary direction.

In the embodiment of the present invention, the dual-torque hinge mechanism may have the first resistance component and the second resistance component provided on the rotary shaft in a rotatable manner. The first bridging component may drive the rotation of the rotary shaft, but cannot directly drag the first resistance component to rotate relative to the second resistance component. The dual-torque hinge mechanism may fix the torque generating component onto the rotary shaft, and utilize the roller and the convex structure (or the slide block and the coarse surface structure) between the torque generating component and the first resistance component to provide a torque adjustment function when the first member and the second member are being folded and unfolded. In the embodiment of the present invention, the roller or the slide block positioned inside the slot may be clipped by the torque generating component and the first resistance component for constraint before arriving the second depth; in other embodiments of the present invention, the roller or the slide block may be clipped by the torque generating component and the first resistance component when being positioned at the second depth of the slot.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
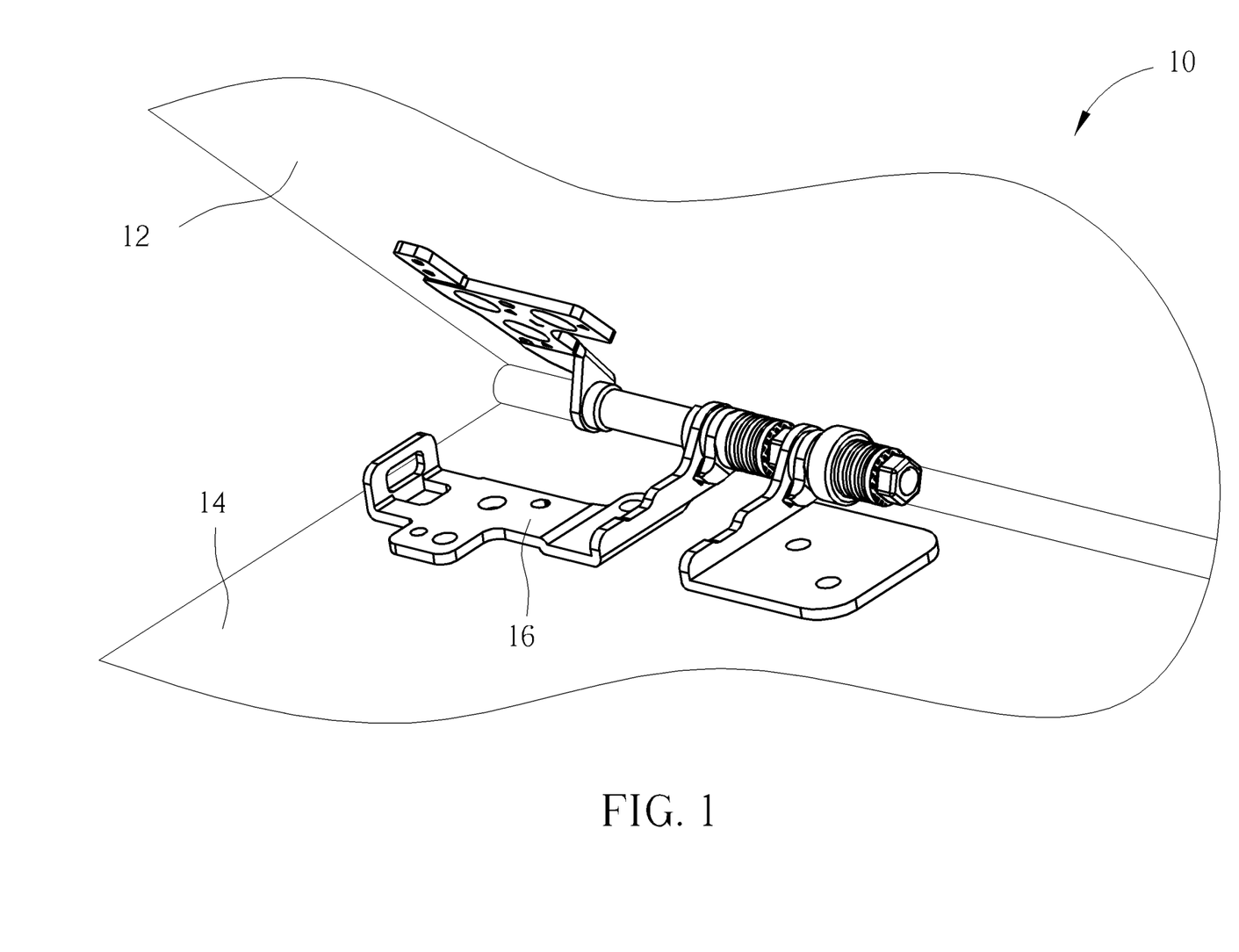
FIG. 1 is a schematic diagram of an electronic device according to an embodiment of the present invention.

Please refer to FIG. 1. FIG. 1 is a schematic diagram of an electronic device 10 according to an embodiment of the present invention. The electronic device 10 includes a first member 12, a second member 14 and a dual-torque hinge mechanism 16. The electronic device 10 may be a notebook computer, and the first member 12 may be a screen cover of the notebook computer and the second member 14 maybe a host base of the notebook computer. When the notebook computer is operated by a user, the second member 14 is put on a plane or on the top of an object, and the first member 12 maybe unfolded relative to the second member 14; for example, the screen cover is unfolded relative to the host base so that the user may watch information displayed on the screen cover. The dual-torque hinge mechanism 16 may be disposed between the first member 12 and the second member 14. The dual-torque hinge mechanism 16 will generate torque of different scales when the first member 12 is being folded and being unfolded relative to the second member 14. For instance, the dual-torque hinge mechanism 16 may provide small-scale torque while the screen cover is being unfolded, so that the user can easily lift the screen cover of the notebook computer; while the screen cover is being folded, the dual-torque hinge mechanism 16 may provide large-scale torque to prevent the screen cover from being unexpectedly dropped onto the host base because of the gravitational force plus the external force applied by the user. The dual-torque hinge mechanism 16 may also be used in any other type of electronic apparatuses.

Figure 2:
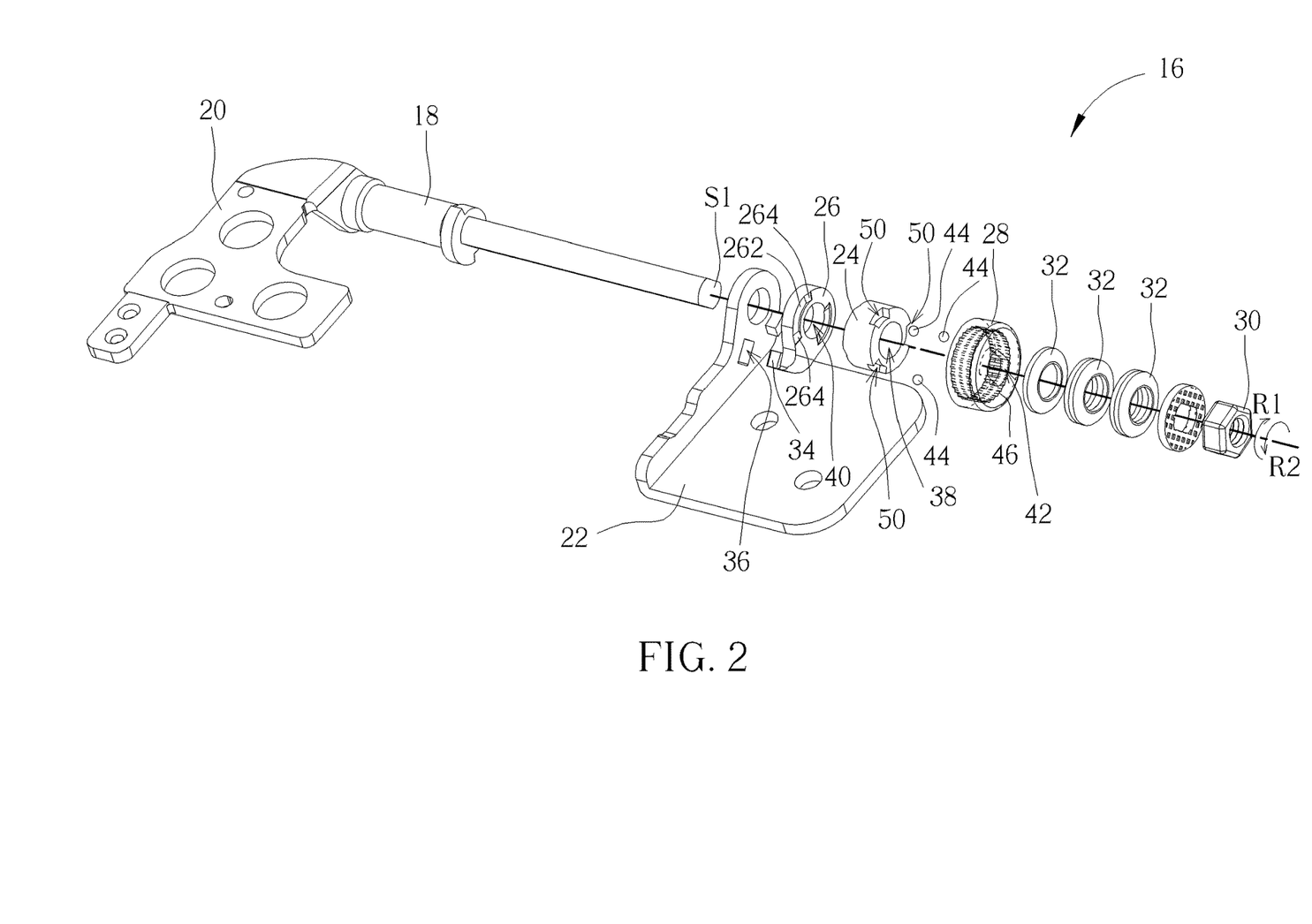
FIG. 2 is an exploded diagram of a dual-torque hinge mechanism according to a first embodiment of the present invention.
Figure 3:
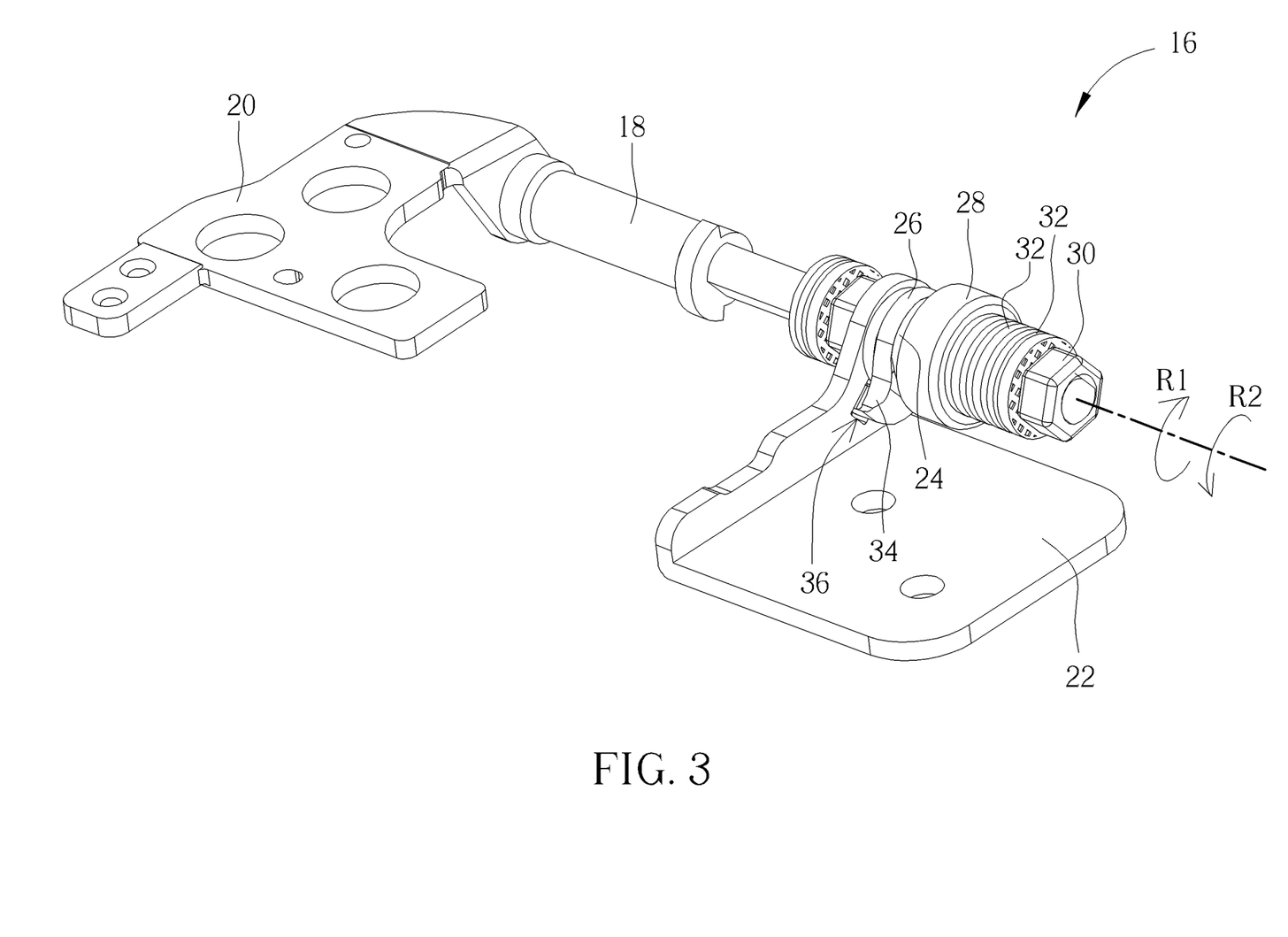
FIG. 3 is an assembly diagram of the dual-torque hinge mechanism according to the first embodiment of the present invention.

Please refer to FIG. 2 and FIG. 3. FIG. 2 is an exploded diagram of the dual-torque hinge mechanism 16 according to a first embodiment of the present invention. FIG. 3 is an assembly diagram of the dual-torque hinge mechanism 16 according to the first embodiment of the present invention. The dual-torque hinge mechanism 16 includes a rotary shaft 18, a first bridging component 20, a second bridging component 22, a first resistance component 24, a second resistance component 26, a torque generating component 28, a constraining component 30 and a buffering component 32. The first bridging component 20 is connected between the first member 12 (such as the screen cover of the notebook computer) and the rotary shaft 18. The first bridging component 20 cannot be rotated relative to the rotary shaft 18. The second bridging component 22 is connected to the second member 14 (such as the host base of the notebook computer) and rotatably disposed on the rotary shaft 18. The first resistance component 24 and the second resistance component 26 are rotatably disposed on the rotary shaft 18. The second resistance component 26 has a stretching portion 34 configured to engage with a positioning portion 36 of the second bridging component 22.

As shown in FIG. 2, the rotary shaft 18 may have a first cross section S1 formed on a portion and along a radial direction of the rotary shaft 18. A shape of the first cross section S1 maybe different from shapes of a through hole 38 of the first resistance component 24 and a through hole 40 of the second resistance component 26. The first resistance component 24 and the second resistance component 26 are not rotated simultaneously with the rotation of the rotary shaft 18. The first resistance component 24 will be simultaneously rotated with the rotation of the rotary shaft 18 when it is actuated by the torque generating component 28. The second resistance component 26 cannot be rotated with the rotation of the rotary shaft 18 due to the engagement of the stretching portion 34 and the positioning portion 36. The torque generating component 28 may have an opening 42, and a shape of the opening 42 corresponds to the shape of the first cross section S1. The portion of the rotary shaft 18 having the first cross section S1 may be engaged with the opening 42 to fix the torque generating component 28 onto the rotary shaft 18, so that the torque generating component 28 will be simultaneously rotated with the rotation of the rotary shaft 18. The buffering component 32 is disposed on the rotary shaft 18 and abuts against the torque generating component 28. The constraining component 30 is rotatably disposed on the rotary shaft 18, and may be moved relative to the rotary shaft 18 toward the left for pressing the buffering component 32. The buffering component 32 will then press the components located on its left side to generate resistance in the direction of rotation between the first resistance component 24 and the second resistance component 26. Torque generated by the dual-torque hinge mechanism 16 may correspond to the number of the buffering component(s) 32 used; the number of the buffering component(s) 32 used is not limited to the embodiment shown in the figures but depends on an actual demand. The first member 12 and the second member 14 are folded when the electronic device 10 is not in use. When the electronic device 10 is ready to use but the first member 12 and the second member 14 are still folded, the first member 12 may be rotated relative to the second member 14 for unfolding, and the first bridging component 20 may be rotated with the rotation of the first member 12 to drive the rotation of the rotary shaft 18, so as to rotate the torque generating component 28 accordingly.

In addition, the first resistance component 24 may have a first driving portion 44, and the torque generating component 28 may have a second driving portion 46. When the first member 12 is rotated relative to the second member 14 for unfolding, the torque generating component 28 is rotated in a first rotary direction R1 and the first driving portion 44 is not actuated by the second driving portion 46, so that the first resistance component 24 is not simultaneously rotated with the rotation of the torque generating component 28 via motion of the torque generating component 28. When the first member 12 is rotated relative to the second member 14 for folding, the torque generating component 28 is rotated in a second rotary direction R2 and the first driving portion 44 will be actuated by the second driving portion 46, and therefore, the first resistance component 24 will be rotated with the rotation of the torque generating component 28 due to the motion of the torque generating component 28. For further details about the operation between the first driving portion 44 and the second driving portion 46, please refer to FIG. 4 and FIG. 5 and the related descriptions.

Figure 4:
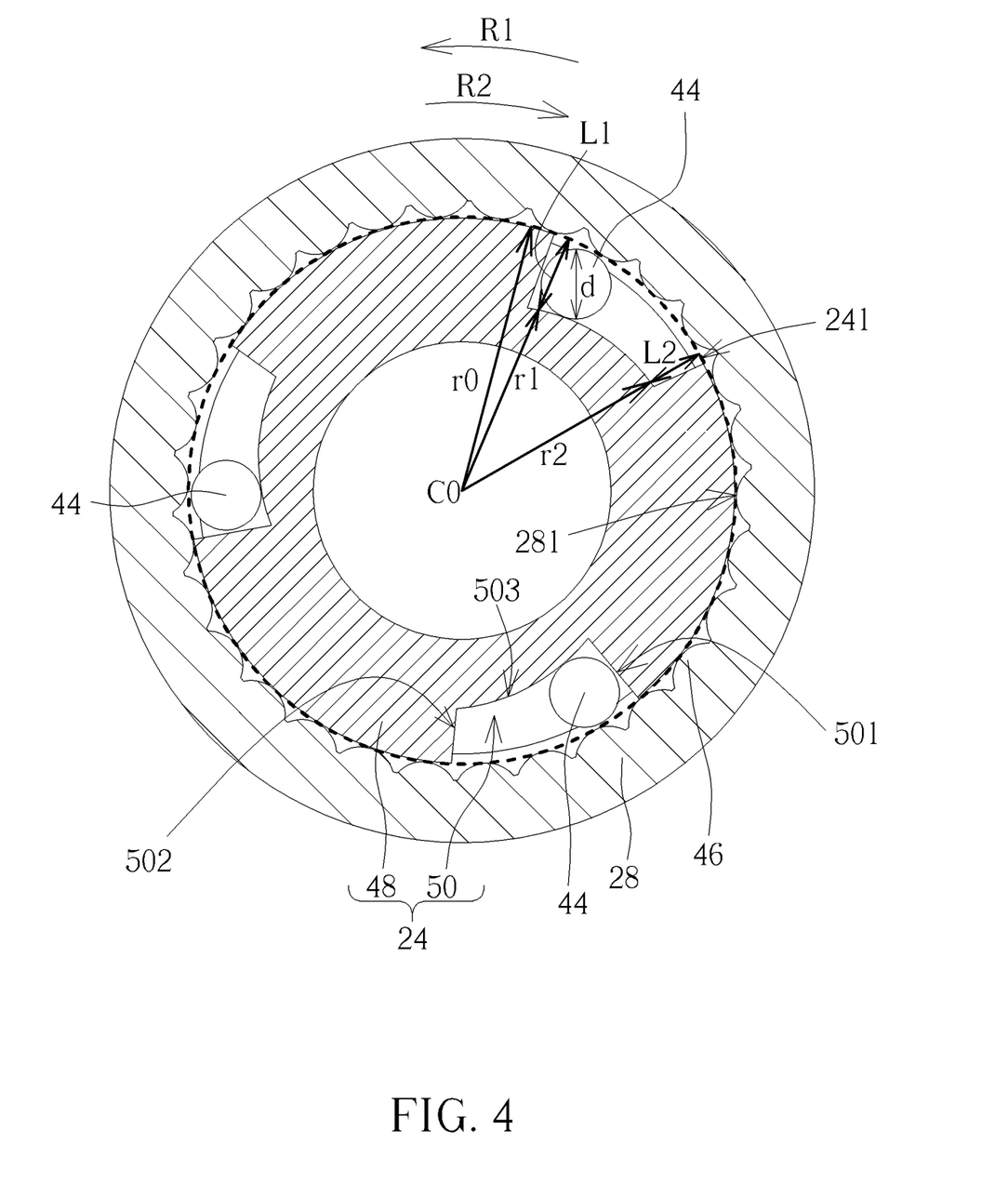
FIG. 4 and FIG. 5 respectively are sectional views of a first resistance component and a torque generating component in different operation modes according to the first embodiment of the present invention.
Figure 5:
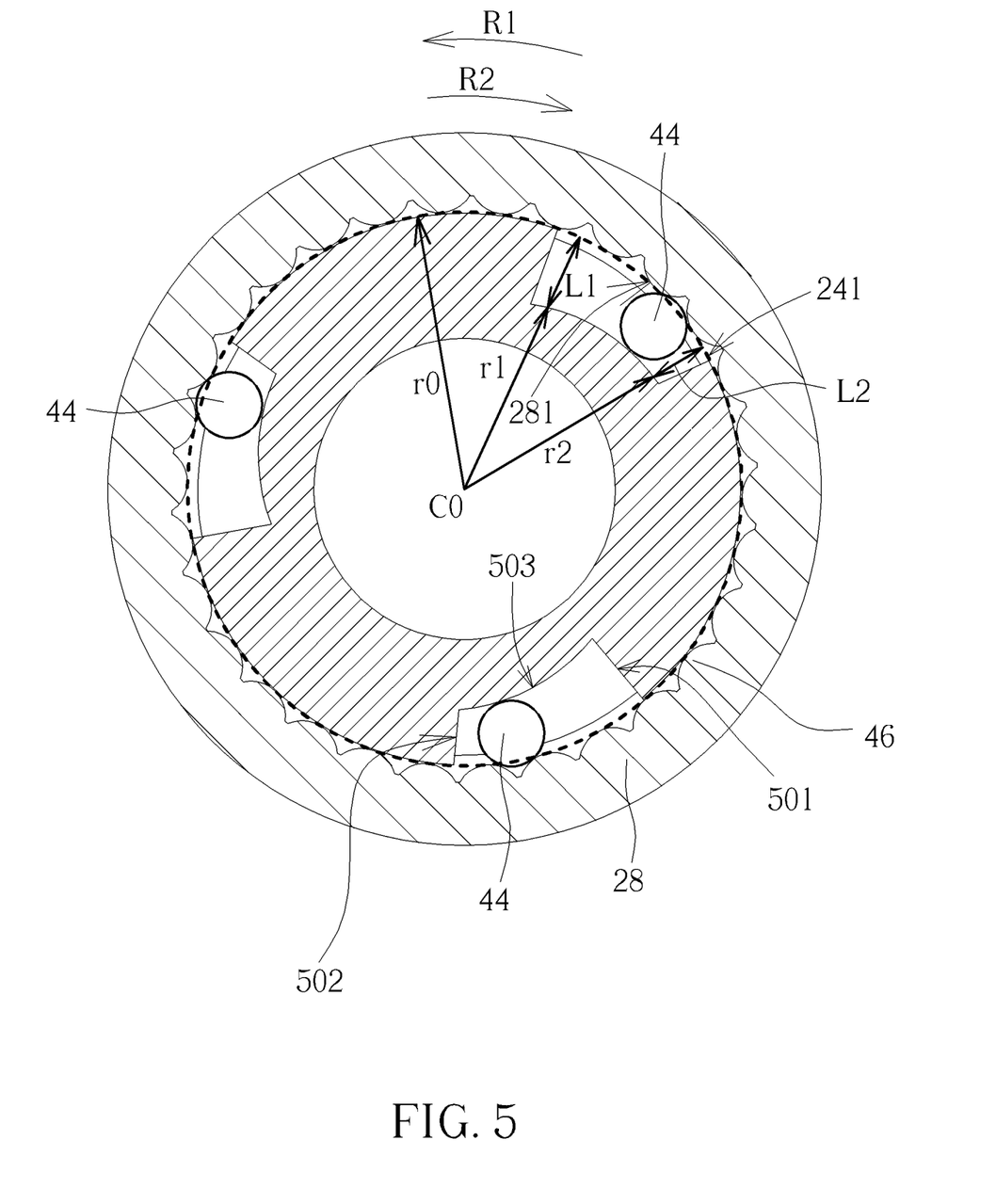

FIG. 4 and FIG. 5 respectively are sectional views of the first resistance component 24 and the torque generating component 28 in different operation modes according to the first embodiment of the present invention. In the first embodiment, the first driving portion 44 is a roller movably disposed inside a slot 50 formed on a main body 48 of the first resistance component 24, and the second driving portion 46 is a convex structure configured to engage with the first driving portion 44 (such as the roller) for positioning. The slot 50 may include two ends 501 and 502 and a bottom surface 503. The two ends 501 and 502 of the slot 50 may respectively have a first depth L1 and a second depth L2. In one embodiment of the present invention, the first depth L1 is greater than the second depth L2, and thus the end 501 with the first depth L1 is defined as the first depth end 501 or the deep end 501, and the end 502 with the second depth L2 is defined as the second depth end 502 or the shallow end 502. A diameter d of the first driving portion 44 is ranged between the first depth L1 and the second depth L2. Moreover, an interval between an inner surface 281 (which means a surface of the convex structure) of the torque generating component 28 and an outer surface 241 of the first resistance component 24 is smaller than a difference between the diameter d of the roller and the second depth L2. In one embodiment of the present invention, a radius r1 from a center C0 of the first resistance component 24 to a point of the bottom surface 503 around the deep end 501 subtracted from a radius r0 from the center C0 to an outer surface 241 (which means the circumference) is the first depth L1, which means L1=r0−r1; a radius r2 from the center C0 of the first resistance component 24 to a point of the bottom surface 503 around the shallow end 502 subtracted from the radius r0 from the center C0 to the outer surface 241 (which means the circumference) is the second depth L2, which means L2=r0−r2.

When the torque generating component 28 is rotated in the first rotary direction R1, the first driving portion 44 (such as the roller) is pushed by the second driving portion 46 (such as the convex structure) and stay around the deep end 501 with the first depth L1 of the slot 50, as shown in FIG. 4. The first depth L1 is greater than the diameter d, and the first driving portion 44 (such as the roller) will be located at the deep end 501 in a loose fit manner. The first resistance component 24 cannot be rotated. Therefore, the first resistance component 24 does not press the second resistance component 26 because the first resistance component 24 is not rotated with the rotation of the torque generating component 28, and the dual-torque hinge mechanism 16 does not generate the torque. When the torque generating component 28 is rotated in the second rotary direction R2, the second driving portion 46 (such as the convex structure) will move the first driving portion 44 (such as the roller) from the deep end 501 with the first depth L1 to the shallow end 502 with the second depth L2 of the slot 50, as shown in FIG. 5. The diameter d of the first driving portion 44 (such as the roller) is greater than the second depth L2, so that the first driving portion 44 is engaged between the bottom surface 503 of the slot 50 and the inner surface 281 of the second driving portion 46 of the torque generating component 28. The first driving portion 44 will press the first resistance component 24, so that the first driving portion 44 and the first resistance component 24 is rotated with the rotation of the torque generating component 28 in the second rotary direction R2. In the meantime, the first resistance component 24 is pressed against and slides relative to the second resistance component 26 and the torque is generated via pressing friction therebetween.

Figure 10:
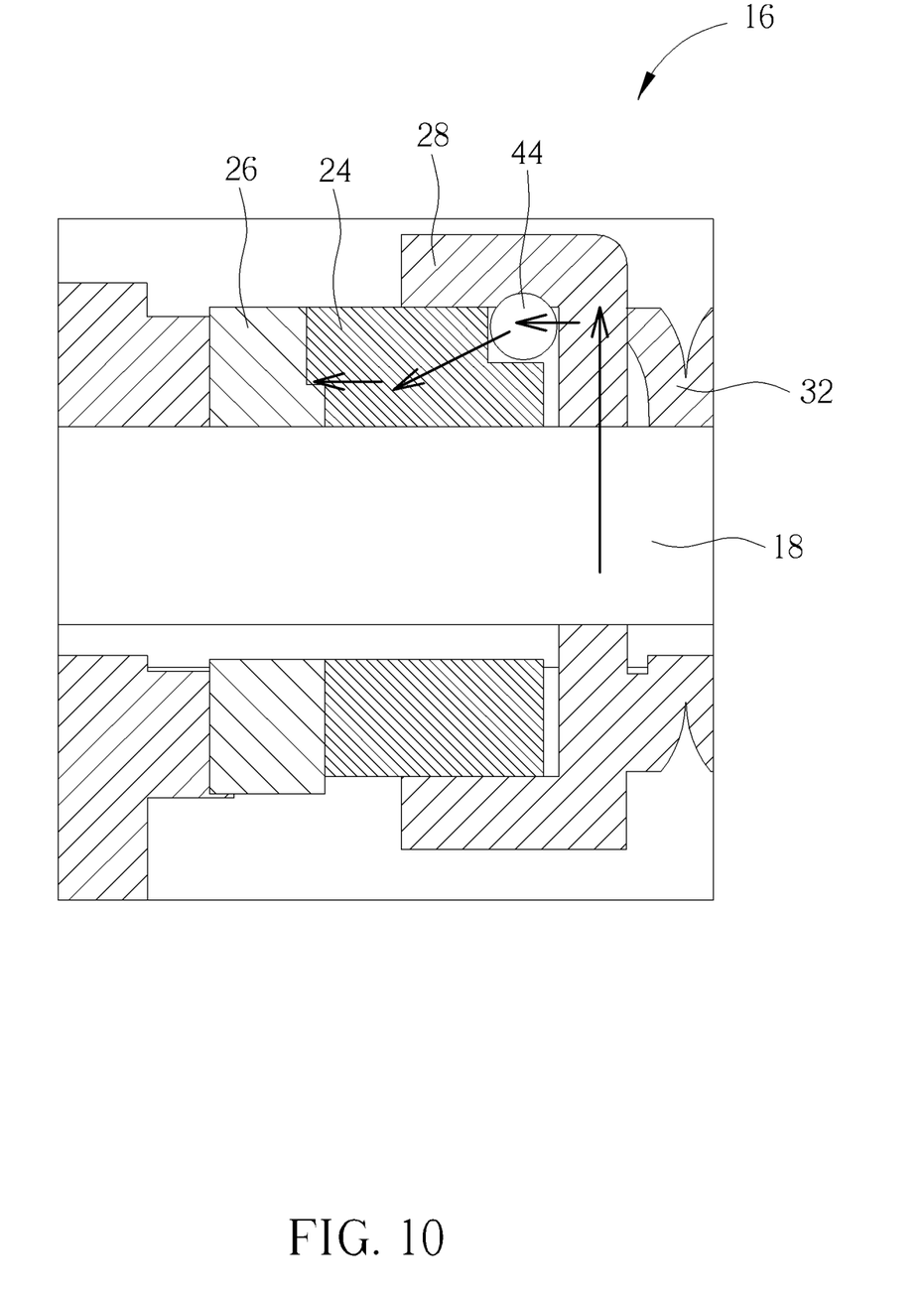
FIG. 10 is a schematic diagram of a part of the dual-torque hinge mechanism according to the first embodiment of the present invention.

Please refer to FIG. 10. FIG. 10 is a schematic diagram of a part of the dual-torque hinge mechanism 16 according to the first embodiment of the present invention. The torque generating component 28 is rotated with the rotation of the rotary shaft 18, and the rotation of the torque generating component 28 will drive the first driving portion 44 to press the first resistance component 24, so that the first resistance component 24 will be rotated accordingly to press the second resistance component 26 for generating resistance force and the torque. The principle of the resistance force between the first resistance component 24 and the second resistance component 26 is: when the user applies the external force to rotate the first bridging component 20, the applied external force will be transferred to the torque generating component 28 via the rotary shaft 18, and then the applied external force will be further transferred from the torque generating component 28 to the first resistance component 24 through the first driving portion 44, and finally the first resistance component 24 transfers the applied external force to the second resistance component 26. Torque transmission between the first resistance component 24 and the second resistance component 26 will be provided by means of the resistance force.

Figure 6:
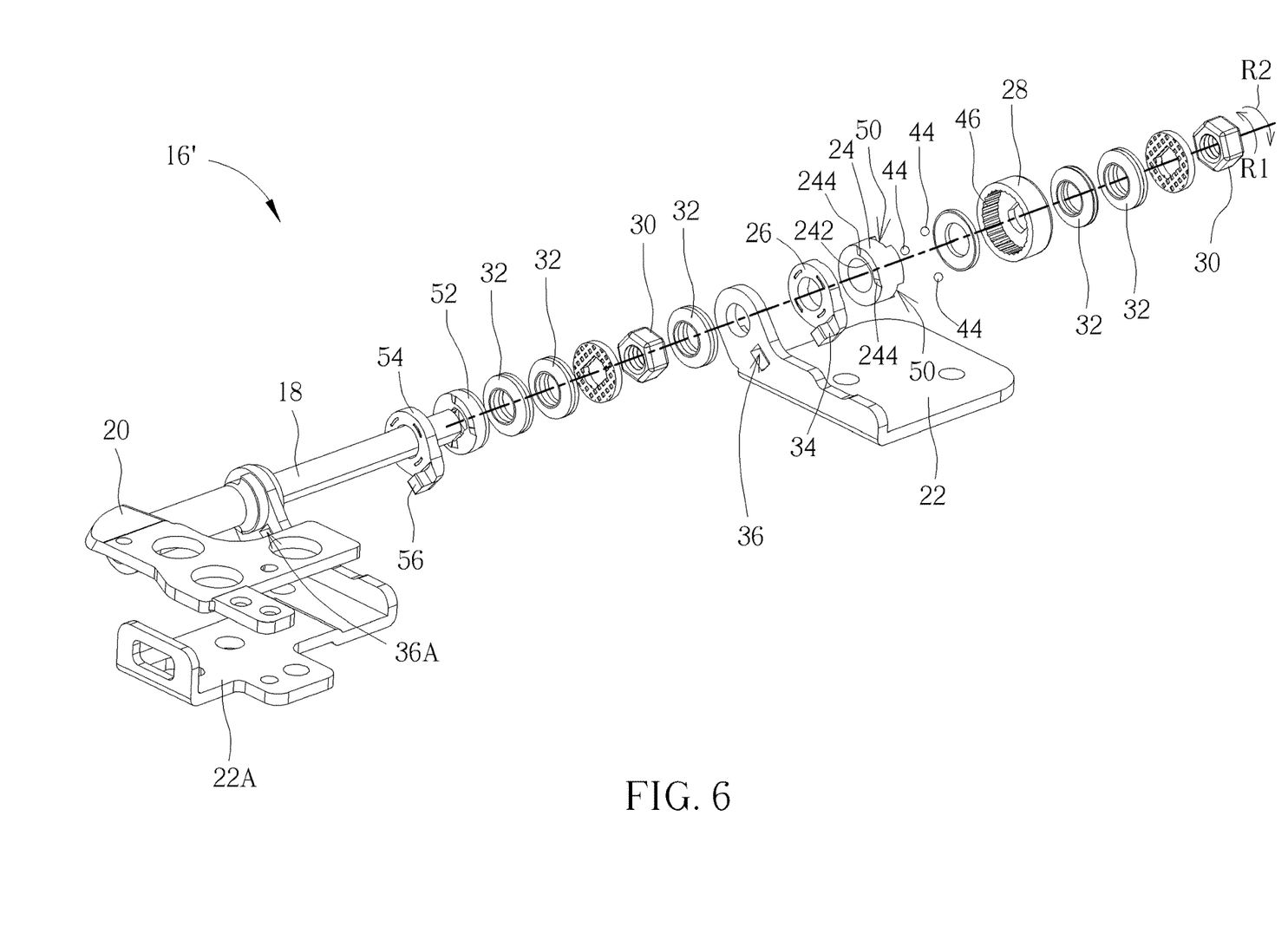
FIG. 6 is an exploded diagram of the dual-torque hinge mechanism according to a second embodiment of the present invention.

Please refer to FIG. 2 and FIG. 6. The first resistance component 24 may have a protruding portion 242, and the second resistance component 26 may have a sunken portion 262 configured to match with the protruding portion 242 of the first resistance component 24. The protruding portion 242 is engaged inside the sunken portion 262 to generate the resistance force when the first resistance component 24 and the second resistance component 26 are relatively rotated. The protruding portion 242 and the sunken portion 262 may respectively have a first inclined surface 244 and a second inclined surface 264. The first inclined surface 244 will abut against the second inclined surface 264; when the resistance force is increased and a force applied to the first resistance component 24 by the buffering component 32 located on its right side is insufficient, the first inclined surface 244 and the second inclined surface 264 between the protruding portion 242 of the first resistance component 24 and the sunken portion 262 of the second resistance component 26 will be slipped, and the first resistance component 24 will be moved to the right for preventing the first resistance component 24 and the second resistance component 26 from being damaged. In other embodiment of the present invention, the first resistance component 24 may have a sunken portion (not shown in the figures), and the second resistance component 26 may have a protruding portion (not shown in the figures) configured to match with the sunken portion of the first resistance component 24 for generating the resistance force and protecting the resistance components from being damaged. In another embodiment of the present invention, the resistance force between the first resistance component 24 and the second resistance component 26 may be acquired due to the pressing friction resulted from a normal force which is generated by the force provided by the buffering component 32 located on their right side and which is applied to contacting surfaces between the first resistance component 24 and the second resistance component 26.

Figure 7:
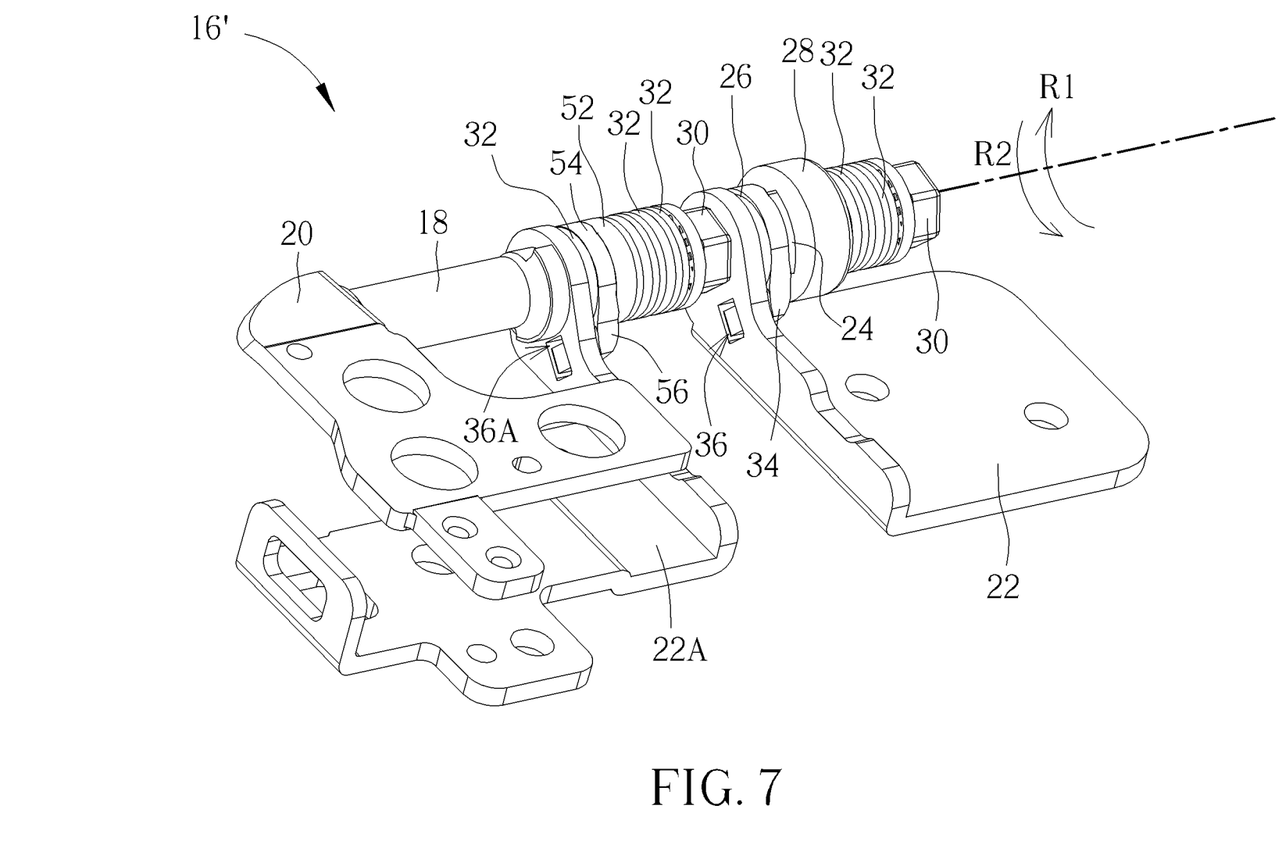
FIG. 7 is an assembly diagram of the dual-torque hinge mechanism according to the second embodiment of the present invention.

Please refer to FIG. 6 and FIG. 7. FIG. 6 is an exploded diagram of the dual-torque hinge mechanism 16' according to a second embodiment of the present invention. FIG. 7 is an assembly diagram of the dual-torque hinge mechanism 16' according to the second embodiment of the present invention. In the second embodiment, elements will have the same reference numerals as those in the first embodiment have the same structures and functions, and a detailed description thereof is omitted herein for simplicity. The dual-torque hinge mechanism 16' not only has the first resistance component 24 and the second resistance component 26, but may also include a third resistance component 52 fixed to the rotary shaft 18 and a fourth resistance component 54 rotatably disposed on the rotary shaft 18. The fourth resistance component 54 may have a stretching portion 56 configured to engage with a positioning portion 36A of a second bridging component 22A of the dual-torque hinge mechanism 16'. The third resistance component 52 may be rotated with the rotation of the rotary shaft 18. The fourth resistance component 54 will not be rotated with the rotation of the rotary shaft 18. In one embodiment of the present invention, the third resistance component 52 and the fourth resistance component 54 may have structures different from those of the first resistance component 24 and the second resistance component 26 but still provide a similar function of generating the resistance force.

In the second embodiment, when the first bridging component 20 and the rotary shaft 18 are rotated in the first rotary direction R1, the resistance force is generated by the third resistance component 52 and the fourth resistance component 54, and the dual-torque hinge mechanism 16' will provide the small-scale torque because the first resistance component 24 is not rotated relative to the second resistance component 26. When the first bridging component 20 and the rotary shaft 18 are rotated in the second rotary direction R2, the resistance force is not only generated by the third resistance component 52 and the fourth resistance component 54, but also by the first resistance component 24 and the second resistance component 26 in response to the rotation of the first resistance component 24 relative to the second resistance component 26 due to the driving of the torque generating component 28; therefore, the dual-torque hinge mechanism 16' will provide the large-scale torque. The dual-torque hinge mechanism 16 of the first embodiment and the dual-torque hinge mechanism 16' of the second embodiment has dual-torque altering functions utilized to provide torque of different scales when the first member 12 (such as the screen cover of the notebook computer) and the second member 14 (such as the host base of the notebook computer) are being folded and unfolded.

Figure 8:
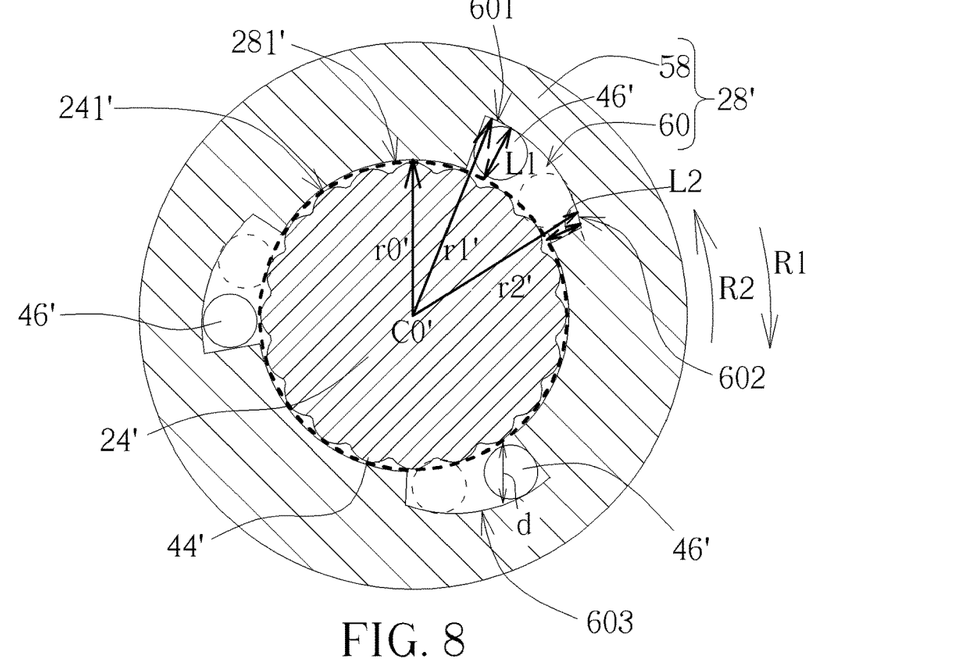
FIG. 8 is a schematic diagram of the first resistance component and the torque generating component according to another embodiment of the present invention.

Please refer to FIG. 8. FIG. 8 is a schematic diagram of the first resistance component 24' and the torque generating component 28' according to another embodiment of the present invention. The first driving portion 44' of the first resistance component 24' is a convex structure. The second driving portion 46' of the torque generating component 28' is a roller movably disposed inside a slot 60 formed on a main body 58 of the torque generating component 28'. As the slot 50 in the above-mentioned embodiment, two ends of the slot 60 may respectively have the first depth L1 and the second depth L2. The first depth L1 is greater than the second depth L2. An end 601, with the first depth L1, of the slot 60 is defined as the first depth end 601 or the deep end 601. An end 602, with the second depth L2, of the slot 60 is defined as the second depth end 602 or the shallow end 602. The diameter d of the second driving portion 46' is ranged between the first depth L1 and the second depth L2. An interval between the outer surface 241' (such as the surface of the convex structure) of the first resistance component 24' and the inner surface 281' of the torque generating component 28' is smaller than a difference between the diameter d of the roller and the second depth L2. In one embodiment of the present invention, a radius r0' from a center C0' of the inner surface 281' of the torque generating component 28' to the inner surface 281' (which means the circumference relative to the center C0') subtracted from a radius r1' from the center C0' of the inner surface 281' of the torque generating component 28' to a point of the bottom surface 603 of the slot 60 around the deep end 601 is equal to the first depth L1, which means L1=r1'−r0'; a radius r0' from the center C0' of the inner surface 281' of the torque generating component 28' to the inner surface 281' (which means the circumference relative to the center C0') subtracted from a radius r2' from the center C0' of the inner surface 281' of the torque generating component 28' to a point of the bottom surface 603 of the slot 60 around the shallow end 602 is equal to the second depth L2, which means L2=r2'−r0'.

When the torque generating component 28' is rotated in the first rotary direction R1, the second driving portion 46' will be located at the first depth L1 (such as the deep end 601) of the slot 60 in the loose fit manner due to motion between the slot 60 and the first driving portion 44'; meanwhile, the first depth L1 is greater than the diameter d, and the first resistance component 24' is not rotated in the first rotary direction R1 with the rotation of the torque generating component 28'. When the torque generating component 28' is rotated in the second rotary direction R2, the first driving portion 44' (such as the convex structure) will push the second driving portion 46' (such as the roller) from the first depth L1 (such as the deep end 601) to the second depth L2 (such as the shallow end 602) of the slot 60. The roller diameter d is greater than the second depth L2, so that the second driving portion 46' will be engaged between the bottom surface 603 of the slot 60 and the first driving portion 44' of the first resistance component 24', which means the second driving portion 46' is clipped by the slot 60 and the first driving portion 44', as the dotted line shown in the figures. The convex structure of the first driving portion 44' will be tightly engaged with the roller of the second driving portion 46', and the first resistance component 24' will be rotated in the second rotary direction R2 with the rotation of the torque generating component 28'. It should be mentioned that the convex structures of the first driving portion 44' in this embodiment and the second driving portion 46 in the above-mentioned embodiment are not limited to a ripple form shown in the figures. The convex structure may be designed as a hemisphere form or a saw-toothed form, or other form, which depends on the actual demand.

Figure 9:
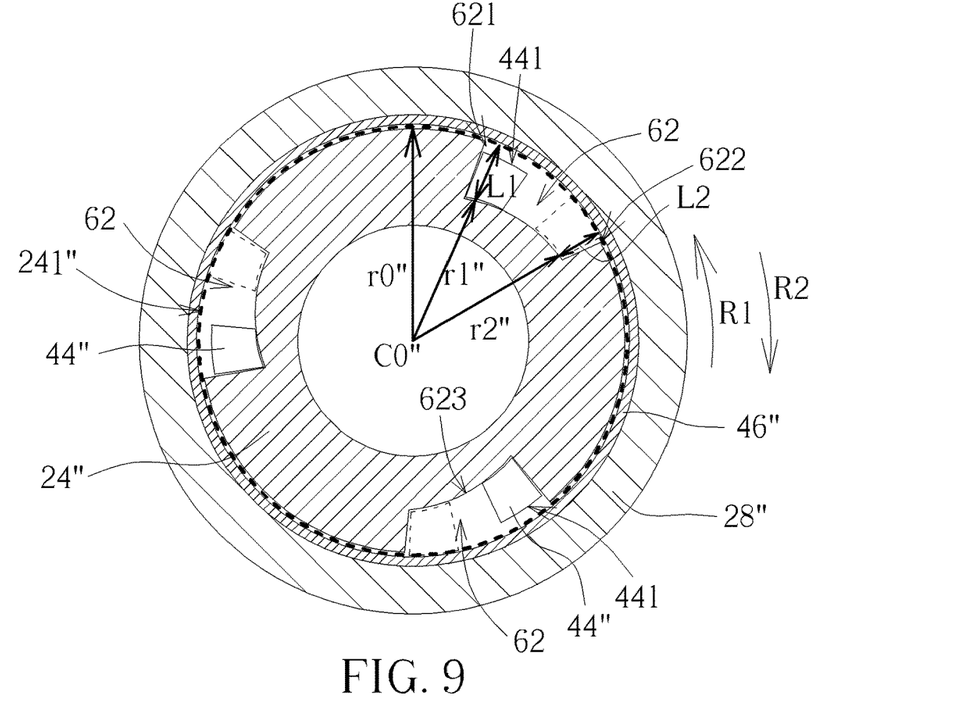
FIG. 9 is a schematic diagram of the first resistance component and the torque generating component according to another embodiment of the present invention.

Please refer to FIG. 9. FIG. 9 is a schematic diagram of the first resistance component 24" and the torque generating component 28" according to another embodiment of the present invention. The first driving portion 44" of the first resistance component 24" is a slide block, and the second driving portion 46" of the torque generating component 28" is a coarse surface structure with a high friction coefficient. The first driving portion 44" is movably disposed inside a slot 62 of the first resistance component 24". Two ends of the slot 62 may respectively have the first depth L1 and the second depth L2. The first depth L1 is greater than the second depth L2. An end 621 with the first depth L1 is defined as the first depth end 621 or the deep end 621. An end 622 with the second depth L2 is defined as the second depth end 622 or the shallow end 622. The slide block of the first driving portion 44" has a height h ranged between the first depth L1 and the second depth L2. An interval between the second driving portion 46" and the outer surface 241" of the first resistance component 24" is smaller than a difference between the height h of the slide block and the second depth L2. The first driving portion 44" may have an abutting area 441 configured to slidably abut against the second driving portion 46". In one embodiment of the present invention, the abutting area 441 may be a plane surface; in other embodiment of the present invention, the abutting area 441 may be a curved surface; in another embodiment of the present invention, the abutting area 441 may be a coarse surface. According to the embodiment of the present invention, a radius r1" from a center C0" of the first resistance component 24" to a point of the bottom surface 623 of the slot 62 around the deep end 621 subtracted from a radius r0" from the center C0" to the outer surface 241" (which means the circumference) is equal to the first depth L1, which means L1=r0"−r1"; a radius r2" from the center C0" of the first resistance component 24" to a point of the bottom surface 623 of the slot 62 around the shallow end 622 subtracted from a radius r0" from the center C0" to the outer surface 241" (which means the circumference) is equal to the second depth L2, which means L2=r0"−r2".

When the torque generating component 28" is rotated in the first rotary direction R1, the second driving portion 46" will push the first driving portion 44" toward the first depth L1 (such as the deep end 621) of the slot 62; in the meantime, the first depth L1 is greater than the height h of the slide block, and the first resistance component 24" is not rotated in the first rotary direction R1 with the rotation of the torque generating component 28". When the torque generating component 28" is rotated in the second rotary direction R2, the second driving portion 46" (such as the coarse surface structure) will move the first driving portion 44" (such as the slide block) from the first depth L1 (such as the deep end 621) to the second depth L2 (such as the shallow end 622) of the slot 62, as the dotted line shown in the figures; meanwhile, the height h of the slide block is greater than the second depth L2, so that the slide block will be engaged between the bottom surface 623 of the slot 62 and the second driving portion 46" of the first resistance component 24", which means the first driving portion 44" is clipped by the second driving portion 46" and the slot 62, and the first driving portion 44" will push the first resistance component 24" to rotate in the second rotary direction R2 with the rotation of the torque generating component 28". The first driving portion 44" in the embodiment is designed as the rectangle slide block; however, the slide block may be designed as an oval cylinder form, a hexagon form or an octagon form. A shape of the slide block is not limited to the above-mentioned embodiments, and depends on the actual demand. According to one embodiment of the present invention, contact surfaces between the first driving portion 44" and the second driving portion 46" are configured to generate a friction force which is high enough for the first driving portion 44" and the second driving portion 46" to move together while they are engaged when the torque generating component 28" is rotated in the second rotary direction R2, and which is low enough for the second driving portion 46" to be disengaged from the first driving portion 44" when the torque generating component 28" is rotated in the second rotary direction R2.

In conclusion, the dual-torque hinge mechanism of the present invention provides the first resistance component and the second resistance component on the rotary shaft in a rotatable manner. The first bridging component will drive the rotation of the rotary shaft, but cannot directly drag the first resistance component to rotate relative to the second resistance component. The dual-torque hinge mechanism may fix the torque generating component onto the rotary shaft, and utilize the roller and the convex structure (or the slide block and the coarse surface structure) between the torque generating component and the first resistance component to provide a torque adjustment function when the first member and the second member are being folded and unfolded. In the above-mentioned embodiments of the present invention, the roller or the slide block positioned inside the slot will be clipped by the torque generating component and the first resistance component for constraint before arriving the second depth; in other embodiments, the roller or the slide block may be clipped by the torque generating component and the first resistance component when it is located at the second depth of the slot.

In the first embodiment, the dual-torque hinge mechanism will provide the small-scale torque when the first member (such as the screen cover of the notebook computer) of the electronic device is being unfolded, and further provide the large-scale torque via the first resistance component and the second resistance component when the first member and the second member (such as the host base of the notebook computer) are being folded. In the second embodiment, when the first member is being unfolded, the dual-torque hinge mechanism utilizes the third resistance component and the fourth resistance component to provide the small-scale torque for convenient operation, and the first resistance component and the second resistance component are inactive in this situation; when the first member is being folded, the dual-torque hinge mechanism utilizes assembly of the first resistance component and the second resistance component, and assembly of the third resistance component and the fourth resistance component to provide the large-scale torque. The first member having a small included angle relative to the second member will be held by the sufficient torque, and the first member and the second member will be folded via the increased external force applied to the first member. Comparing to the prior art, the dual-torque hinge mechanism and the related electronic device of the present invention has the dual-torque altering function, and provides torque of different scales when the first member and the second member are being folded and unfolded, so as to conform to modern custom behavior of a consumer electronic product.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A dual-torque hinge mechanism, comprising:
   a rotary shaft;
   a first bridging component connected to the rotary shaft;
   a second bridging component rotatably disposed on the rotary shaft;
   a first resistance component rotatably disposed on the rotary shaft, the first resistance component having a first driving portion;
   a second resistance component abutting against the first resistance component and rotatably disposed on the rotary shaft and connected to the second bridging component, the second resistance component and the second bridging component being simultaneously rotated relative to the rotart shaft; and
   a torque generating component fixed to the rotary shaft, the torque generating component having a second driving portion, the second driving portion not actuating the first driving portion and the first resistance component being not rotated with rotation of the torque generating component when the first driving portion is pushed by the second driving portion rotated in a first rotary direction, the first resistance component being rotated with the rotation of the torque generating component when the first driving portion is pushed by the second driving portion rotated in a second rotary direction different from the first rotary direction.

2. The dual-torque hinge mechanism of claim 1, further comprising:
   a constraining component disposed on the rotary shaft; and
   at least one buffering component disposed on the rotary shaft between the constraining component and the torque generating component, and abutting against the torque generating component.

3. The dual-torque hinge mechanism of claim 1, wherein the rotary shaft has a first cross section formed along a radial direction of the rotary shaft, a shape of the first cross section is different from shapes of a through hole of the first resistance component and a through hole of the second resistance component, and a portion of the rotary shaft having the first cross section is engaged with the torque generating component.

4. The dual-torque hinge mechanism of claim 1, wherein the first driving portion is a roller movably disposed inside a slot of the first resistance component, two ends of the slot respectively have a first depth end with a first depth and a second depth end with a second depth, the first depth is greater than the second depth, and a diameter of the roller is ranged between the first depth and the second depth.

5. The dual-torque hinge mechanism of claim 4, wherein the second driving portion is a convex structure configured to engage with the roller for moving the roller to the first depth end or to the second depth end.

6. The dual-torque hinge mechanism of claim 4, wherein an interval between an inner surface of the torque generating component and an outer surface of the first resistance component is smaller than a difference between the diameter of the roller and the second depth.

7. The dual-torque hinge mechanism of claim 1, wherein the second driving portion is a roller movably disposed inside a slot of the torque generating component, two ends of the slot respectively have a first depth end with a first depth and a second depth end with a second depth, the first depth is greater than the second depth, and a diameter of the roller is ranged between the first depth and the second depth.

8. The dual-torque hinge mechanism of claim 7, wherein the first driving portion is a convex structure configured to engage with the roller for moving the roller to the first depth end or to the second depth end.

9. The dual-torque hinge mechanism of claim 1, wherein the first driving portion is a slide block, and an abutting area of the slide block slidably abuts against the second driving portion.

10. The dual-torque hinge mechanism of claim 1, further comprising:
   a third resistance component fixed to the rotary shaft; and
   a fourth resistance component rotatably disposed on the rotary shaft and connected to another second bridging component of the dual-torque hinge mechanism, the fourth resistance component and the another second bridging component being simultaneously rotated relative to the rotary shaft.

11. The dual-torque hinge mechanism of claim 10, wherein the another second bridging component comprises another positioning portion, and the fourth resistance component comprises another stretching portion adapted to engage with the another positioning portion.

12. The dual-torque hinge mechanism of claim 1, wherein the second bridging component comprises a positioning portion, and the second resistance component comprises a stretching portion adapted to engage with the positioning portion.

13. An electronic device with a dual-torque altering function, comprising:
   a first member;
   a second member; and a dual-torque hinge mechanism disposed between the first member and the second member, the first member being rotated relative to the second member via the dual-torque hinge mechanism, the dual-torque hinge mechanism comprising:

a rotary shaft;

a first bridging component connected to the rotary shaft and assembled with the first member;

a second bridging component rotatably disposed on the rotary shaft and assembled with the second member;

a first resistance component rotatably disposed on the rotary shaft, the first resistance component having a first driving portion;

a second resistance component abutting against the first resistance component and rotatably disposed on the rotary shaft and connected to the second bridging component, the second resistance component and the second bridging component being simultaneously rotated relative to the rotary shaft; and a torque generating component fixed to the rotary shaft, the torque generating component having a second driving portion, the second driving portion not actuating the first driving portion and the first resistance component being not rotated with rotation of the torque generating component when the first driving portion is pushed by the second driving portion rotated in a first rotary direction, the first resistance component being rotated with the rotation of the torque generating component when the first driving portion is pushed by the second driving portion rotated in a second rotary direction different from the first rotary direction.

14. The electronic device of claim 13, wherein the dual-torque hinge mechanism further comprises a constraining component and at least one buffering component, the constraining component is disposed on the rotary shaft, and the at least one buffering component is disposed on the rotary shaft between the constraining component and the torque generating component, and abuts against the torque generating component.

15. The electronic device of claim 13, wherein the rotary shaft has a first cross section formed along a radial direction of the rotary shaft, a shape of the first cross section is different from shapes of a through hole of the first resistance component and a through hole of the second resistance component, and a portion of the rotary shaft having the first cross section is engaged with the torque generating component.

16. The electronic device of claim 13, wherein the first driving portion is a roller movably disposed inside a slot of the first resistance component, two ends of the slot respectively have a first depth end with a first depth and a second depth end with a second depth, the first depth is greater than the second depth, and a diameter of the roller is ranged between the first depth and the second depth.

17. The electronic device of claim 16, wherein the second driving portion is a convex structure configured to engage with the roller for moving the roller to the first depth end or to the second depth end.

18. The electronic device of claim 16, wherein an interval between an inner surface of the torque generating component and an outer surface of the first resistance component is smaller than a difference between the diameter of the roller and the second depth.

19. The electronic device of claim 13, wherein the second driving portion is a roller movably disposed inside a slot of the torque generating component, two ends of the slot respectively have a first depth end with a first depth and a second depth end with a second depth, the first depth is greater than the second depth, and a diameter of the roller is ranged between the first depth and the second depth.

20. The electronic device of claim 19, wherein the first driving portion is a convex structure configured to engage with the roller for moving the roller to the first depth end or to the second depth end.

21. The electronic device of claim 13, wherein the first driving portion is a slide block, and an abutting area of the slide block slidably abuts against the second driving portion.

22. The electronic device of claim 13, wherein the dual-torque hinge mechanism further comprises a third resistance component and a fourth resistance component, the third resistance component is fixed to the rotary shaft, the fourth resistance component is rotatably disposed on the rotary shaft and connected to another second bridging component of the dual-torque hinge mechanism, and the fourth resistance component and the another second bridging component being simultaneously rotated relative to the rotary shaft.

23. The electronic device of claim 22, wherein the another second bridging component comprises another positioning portion, and the fourth resistance component comprises another stretching portion adapted to engage with the another positioning portion.

24. The electronic device of claim 13, wherein the second bridging component comprises a positioning portion, and the second resistance component comprises a stretching portion adapted to engage with the positioning portion.

* * * * *